United States Patent [19]  [11] Patent Number: 4,847,748
Yamahata et al.  [45] Date of Patent: Jul. 11, 1989

[54] VIRTUAL MEMORY ARRANGEMENT DATA PROCESSING SYSTEM WITH DECODING AND EXECUTION OF PREFETCHED INSTRUCTIONS IN PARALLEL

[75] Inventors: Hitoshi Yamahata; Yoshikuni Sato, both of Tokyo, Japan

[73] Assignee: NEC Corporation, Tokyo, Japan

[21] Appl. No.: 30,021

[22] Filed: Mar. 25, 1987

[30] Foreign Application Priority Data

Mar. 25, 1986 [JP] Japan ................................. 61-67843

[51] Int. Cl.⁴ .......................... G06F 9/38; G06F 9/28
[52] U.S. Cl. ................... 364/200; 364/254.5; 364/256.3; 364/259.9; 364/263.1
[58] Field of Search ... 364/200 MS File, 900 MS File

[56] References Cited

U.S. PATENT DOCUMENTS

| | | | |
|---|---|---|---|
| 4,200,927 | 4/1980 | Hughes et al. ...................... | 364/200 |
| 4,394,725 | 7/1983 | Bienvenu ............................ | 364/200 |
| 4,396,982 | 8/1983 | Wada et al. ........................ | 364/200 |
| 4,521,851 | 6/1985 | Trubisky et al. ................... | 364/200 |
| 4,707,784 | 11/1987 | Ryan ................................. | 364/200 |
| 4,722,046 | 1/1988 | Kasrazadeh et al. ............... | 364/200 |
| 4,734,849 | 3/1988 | Kinoshita ........................... | 364/200 |
| 4,763,245 | 8/1988 | Emma et al. ....................... | 364/200 |

Primary Examiner—Archie E. Williams, Jr.
Assistant Examiner—Eric Coleman
Attorney, Agent, or Firm—Foley & Lardner, Schwartz, Jeffery, Schwaab, Mack, Blumenthal & Evans

[57] ABSTRACT

A data processing system comprises: an instruction queue memory; an instruction decode unit; an address computation unit; an address translation unit; and an instruction execution unit. Further comprised is a decoded instruction queue memory having a queue structure composed of a plurality of entries for latching an entry information. The decoded instruction queue memory includes: a first counter adapted to be counted up in response to the effective address computation requiring signal of the instruction decode unit and down in response to the translation completion signal of the address translation unit; and a second counter having a counting-down function. When the first and second counters are to be counted down, one closer to the instruction execution unit and having a counted value other than zero is counted down. When the queue is the decoded instruction queue memory advances, the first counter has its counted value copied to that of the second counter and then set at the value of zero. The instruction decode unit can execute the instruction decoding and execution in parallel, and a decoding, an effective address computation and an address translation of the decoded instruction in parallel, thereby to shorten the decoding time period.

10 Claims, 11 Drawing Sheets

VIRTUAL MEMORY ARRANGEMENT DATA PROCESSING SYSTEM WITH DECODING AND EXECUTION OF PREFETCHED INSTRUCTIONS IN PARALLEL

BACKGROUND OF THE INVENTION

1. Field of the Invention

The present invention relates to a central processing unit forming a major part of a data processing system and, more particularly, to an instruction decoder and a decoder control for the data processing system.

1. Description of related art.

Heretofore, a so-called central processing unit comprises, for example, an instruction prefetch unit 101, an instruction decode unit 102, an address translation unit 103, an instruction execution unit 104, and a bus interface 105, respectively, as shown in FIG. 1. The instruction prefetch unit 101 has an instruction queue memory for storing an instruction code prefetched from the bus interface 105 and reads the prefetched instruction code from the instruction queue memory in response to a request of the instruction decode unit 102. The instruction decode unit 102 decodes the instruction code read out of the instruction prefetch unit 101 to issue a control information to the instruction execution unit 104. The instruction decode unit 102 computes the effective address of a memory operand and requests the address translation unit 103 an address translation. The address translation unit 103 conducts a translation from a virtual address into a real address and transfers the translation result to the bus interface 105. The instruction execution unit 104 executes an operation on the basis of the control information sent from the instruction decode unit 102. The bus interface 105 accesses an external memory on the basis of the real address sent from the address translation unit 103 and prefetches an instruction for the instruction prefetch unit 101.

FIG. 2 shows in more detail the instruction decode unit 102 and the address translation unit 103 shown in FIG. 1. Reference numeral 801 denotes the instruction queue memory built in the instruction prefetch unit 101 for storing an instruction code. Reference Numeral 802 denotes an instruction-code/operand-field decoder of the instruction decode unit 102. Further, an address computation section 803 is provided for computing the addresses of an effective address operand and a memory operand on the basis of the decoded result of an operand field. The effective address computed by the address computation section 803 is translated by an address translator 804 from a virtual address into a real address in the case of the memory operand, and the real address is sent to the bus interface 105. The address translator 804 corresponds to the address translation unit 103 of FIG. 1. In addition, an instruction buffer 805 is provided for transferring the decoded information obtained by the instruction decoder 802 to the instruction execution unit 104.

In the data processing system thus constructed, an instruction is first sent from the instruction queue memory 801 to the instruction decoder 802. This instruction decoder 802 decodes an information concerning the instruction code such as the kind of an arithmetic algorithm and sets the result in the instruction buffer 805. Then, the instruction decoder 802 decodes the operand part of the instruction. At this time, in case the operand is a memory operand, the instruction decoder 802 instructs the address computation section 803 to perform an effective address computation. The address computation section 803 sends the computed effective address to the address translator 804, in which the virtual address is translated into a real address. This real address is sent to the bus interface 105 so that the memory operand may be fetched. The instruction decoder 802 is informed, from the address translator 804 through the address computation section 803, of whether the address has been translated exceptionally by a page fault or a protection exception or normally. The instruction decoder 802 sets the instruction buffer 805 with an information indicating an instruction executability, if the address translation is normal, and an information indicating an exception processing start, if the translation is exceptional. Then, the instruction execution unit 104 is started.

On the basis of the information read out of the instruction buffer 805, the instruction execution unit 104 executes the instruction. If, however, a translation exception is read out of the instruction buffer 805, the instruction execution unit 104 executes a corresponding processing such as the page fault and requests the instruction decode unit 102 a redecode of the instruction. In the case of no translation exception when the instruction is decoded, the instruction execution unit 104 requests the instruction decode unit 102 to start the decoding of a next instruction at the instant when its instruction execution is completed.

Usually, under the virtual memory management, in the case that the operand has its address translated exceptionally as in the page fault, the instruction cannot be executed before the operand address is settled after its decoding. For example, in case the page fault occurs, the instruction need be re-executed after the exception is processed by the operating system. Despite of this necessity, however, the system of the prior art described above can neither process the address translation exception nor execute the instruction unless the execution of the instruction is conducted after the completion of decoding the instruction. The decoding of a next instruction is started at the completion of the execution of the previous instruction. As a result, the data processing system of the prior art has a defect that it cannot conduct the instruction decoding and execution in parallel under the virtual memory management to improve its performance.

SUMMARY OF THE INVENTION

Accordingly, it is an object of the present invention to provide a data processing system which has an instruction decode unit capable of executing an instruction decoding and execution in parallel even under the virtual memory management thereby to shorten the time period for decoding the instruction.

Another object of the present invention is to provide a data processing system which has an instruction decode unit capable of executing a decoding, an effective address computation and an address translation of the instruction decoding in parallel even during the instruction decoding, thereby to shorten the time period for decoding the instruction.

According to a major feature of the present invention, there is provided a data processing system including: instruction prefetch means having an instruction queue memory for storing a prefetched instruction code; instruction decoding means for issuing an effective address computation requiring signal requiring the queue memory the readout of an instruction and for decoding the operation code and operand field, if any, of the instruction requested thereby and read out of the queue memory; effective address computing means for conducting an effective address computation in response to the request of the instruction decoding means; address translating means for translating a virtual address into a real address to issue a translation completion signal and for detecting a translation exception; and instruction execution means for reading out and executing the instruction, if executable, wherein the improvement comprises a decoded instruction queue memory having a queue structure composed of a plurality of entries for latching an entry information, including: first counter means adapted to be counted up in response to the effective address computation requiring signal and down in response to the translation completion signal; and second counter means having a counting-down function such that, when the first and second counter means are to be counted down, one closer to the instruction execution means and having a counted value other than zero is counted down, and such that when the queue in the decoded instruction queue memory advances, the first counter means has its counted value copied to that of the second counter means and then set at the value of zero.

In one embodiment of the data processing system according to the present invention, the decoded information is transferred only when the second counter means has the value of zero at that step of the decoded instruction queue memory, which is the closest to the instruction executing means.

The data processing system can further comprises an effective address register for latching the effective address value issued from the effective address computing means if the operand has an effective address value.

Preferably, the first counter means includes a queue memory control for controlling the queue, and the second counter means includes a counter field formed in each of the entries of the decoded instruction queue memory and adapted to be initialized by the instruction decoding means and decremented in response to the effective address computation requiring signal of the instruction decoding means.

The decoded instruction queue memory further includes in each of the entries: an instruction field adapted to be set with an information concerning the decoded instruction and operand of the instruction decoding means; a valid flag indicating the validity of the content of the queue, and an exception flag indicating the occurrence of an address translation exception when in the address translation of the address translating means.

Specifically, the instruction decoding means includes: an instruction decoder control for requiring the instruction queue memory the transfer of the instruction code and instructing a decoding; an operation code decoder for decoding the instruction code of the instruction queue memory in response to the instruction of the instruction decoder control and sending the decoded result to the decoded instruction queue memory and the information indicating the number and kind of the operands revealed to the instruction decoder control; and a operand decoder for decoding the operand part of the instruction code of the instruction queue memory in response to the instruction of the instruction decoder control.

Further, the effective address computing means includes: an address computation control for controlling the actions of the effective address computing means; and address computation section for conducting an effective address computation; and an address latch for latching the effective address computed by the address computation section.

In addition, the address translating means includes: an address translator for translating a real address computed by the effective address computing means into a virtual address and checking a translation exception.

BRIEF DESCRIPTION OF THE DRAWINGS

Other objects, features and advantages of the present invention will become apparent from the following description taken with reference to the accompanying drawings, in which.

DESCRIPTION OF THE PREFERRED EMBODIMENT

Figure 1:
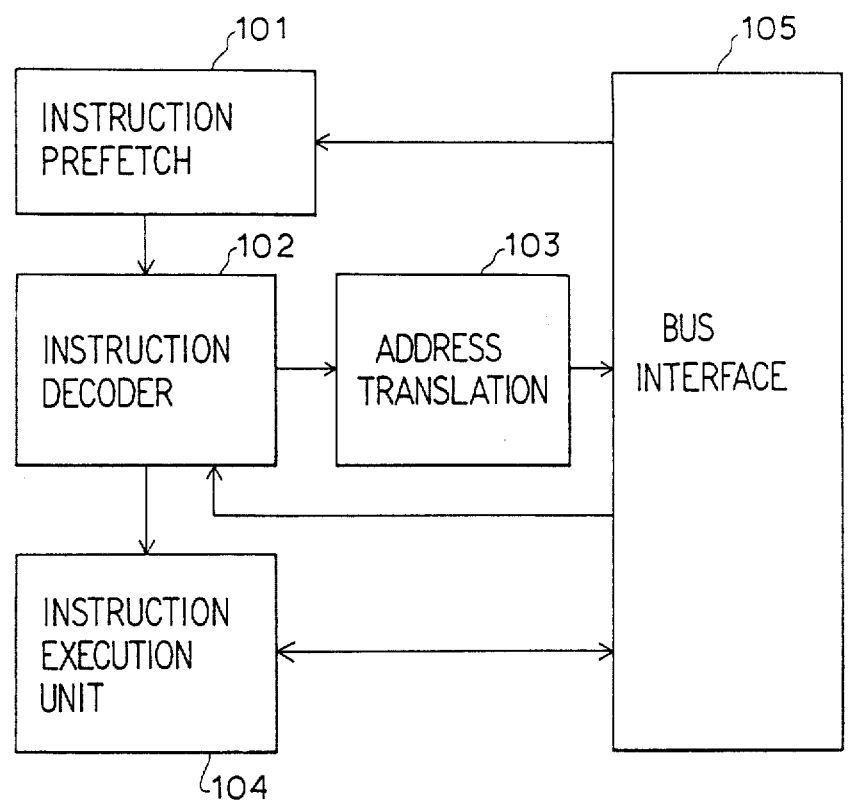
FIG. 1 is a block diagram showing the central data processing system of the prior art.
Figure 2:
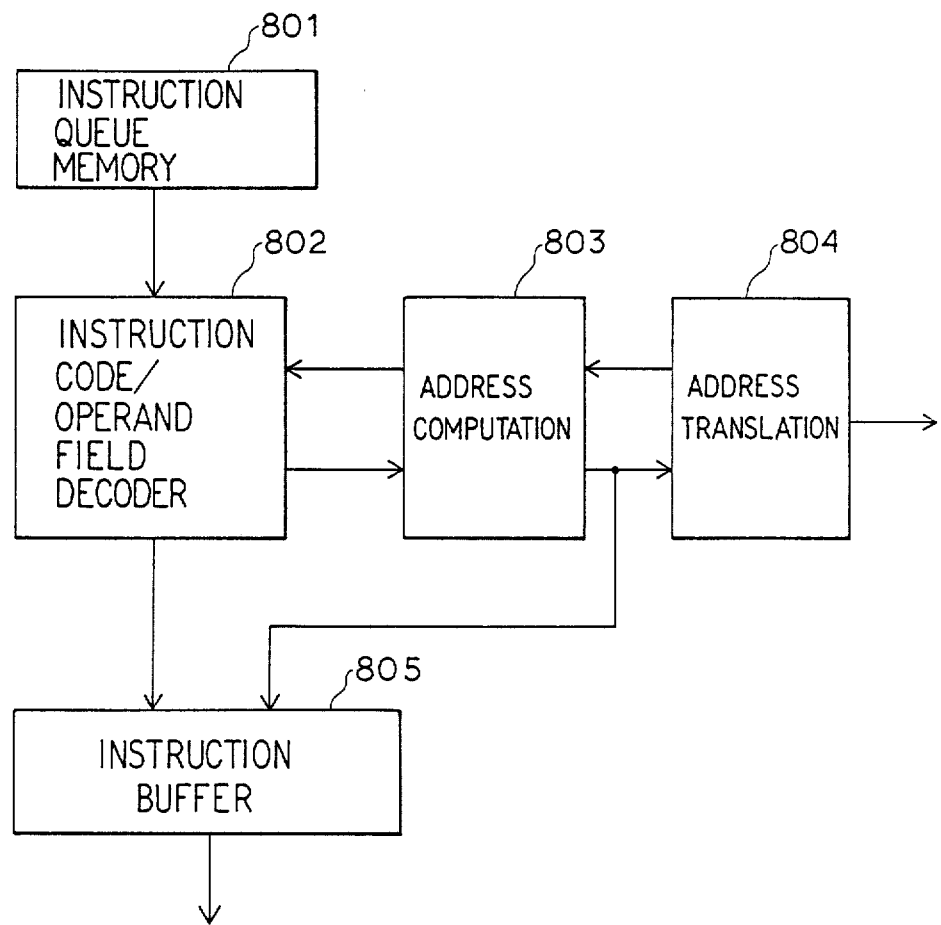
FIG. 2 is a block diagram showing the instruction decode unit of the central data processing system of the prior art.
Figure 3:
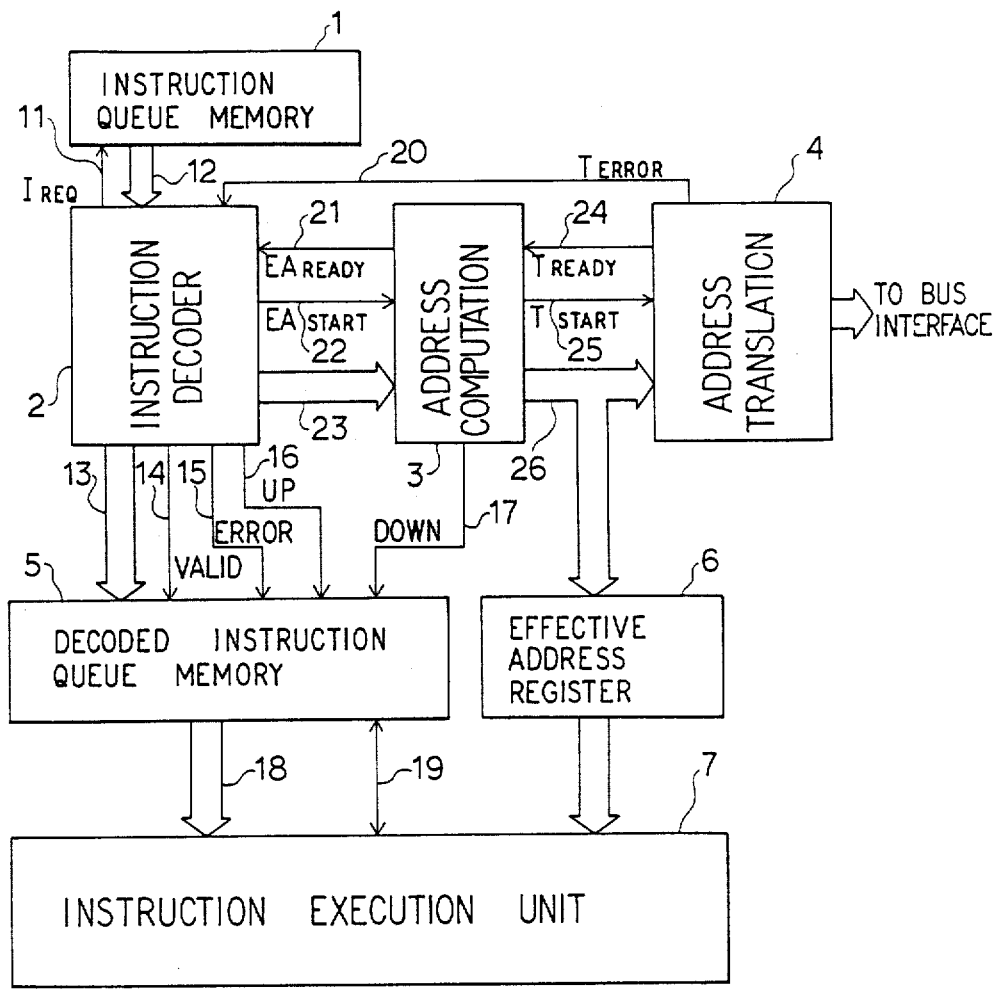
FIG. 3 is a block diagram showing a microprocessor in accordance with one embodiment of the present invention.

The present invention will be described in detail in the following with reference to the accompanying drawings. FIG. 3 is a block diagram showing an essential portion of a microprocessor in accordance with one embodiment of the present invention.

The shown microprocessor comprises an instruction queue memory 1 built in an instruction prefetch unit (not-shown) for storing a prefetched instruction code. In response to an instruction code readout requiring signal $I_{req}$ 11 from an instruction decode unit 2, an instruction is read from the queue memory 1 through a bus 12 to the decode unit 2. As to the instruction read out of the instruction queue memory 1 through a bus 12, the decode unit 2 first decodes the operation code and then the operand field, if any, on the basis of the decoded result of the operation code, to set a decoded instruction queue memory 5 through a bus 13 with an information necessary for instruction execution such as the kind of an arithmetic algorithm and an information concerning the operand. On the basis of the decoded result of the operand, moreover, the instruction decode unit 2 sends data necessary for computing the effective addresses of an effective address operand and a memory operand to an address computation unit 3 through a bus 23.

This address computation unit 3 conducts the effective address computation in response to the request from the instruction code unit 2. The effective address thus obtained are supplied through a bus 26 to an address translation unit 4 where an address translation is made from a virtual address into a real address and a translation exception ($T_{error}$) such as the page fault or the protection exception is detected.

The aforementioned decoded instruction queue memory 5 has a function to latch in its queue structure an entry information containing the information concerning the operation code and the operand obtained by decoding the instruction, the information concerning the operand needing the effective address computation, the flag information indicating the address translation exception generated in the operand, and the flag information indicating the validity of the queue. An effective address register latches an effective address value issued from the address computation unit 3 in case the operand is the effective address value. An instruction execution unit 7 is adapted to read through a bus 18 the instruction of the entry at the output of the decoded instruction queue memory 5, when that information becomes executable, to execute the instruction.

Figure 4:
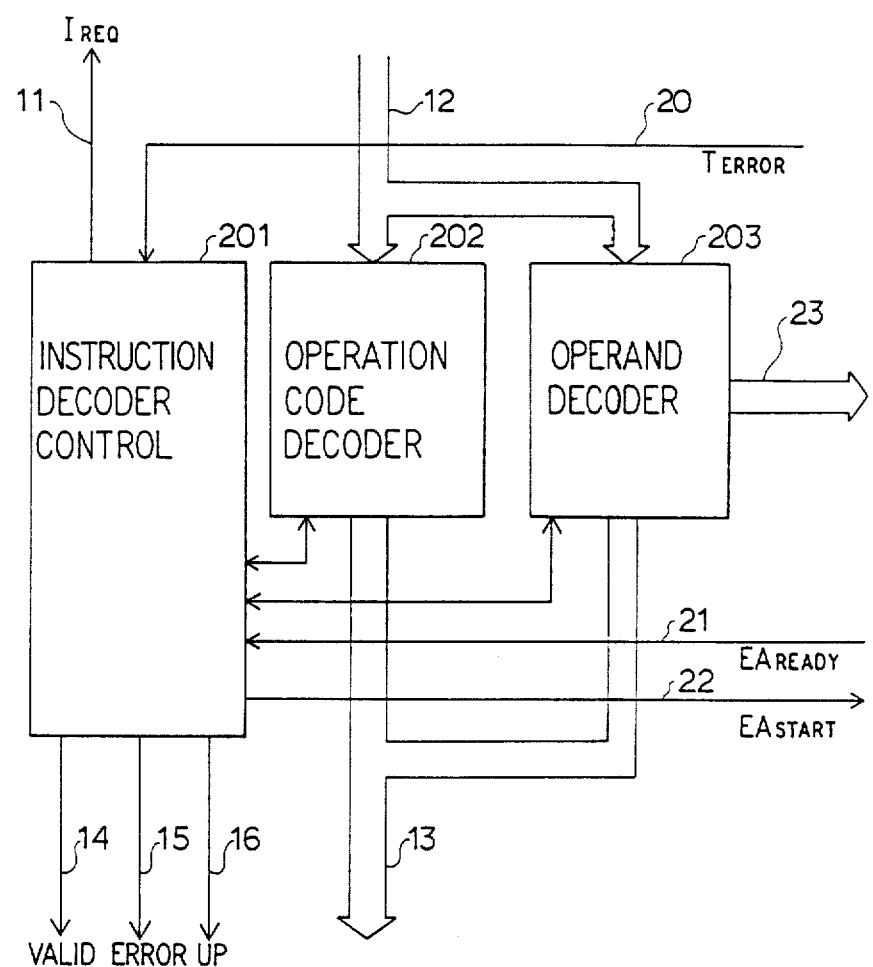
FIG. 4 is a detailed block diagram showing the instruction decode unit of FIG. 3.

Of operations of the above mentioned embodiment, the instruction operand processing (i.e., the effective address operand processing and the memory operand processing) and the processing of the validity of the decoded instruction queue memory 5 will be described in detail in the following:

First of all, the internal structure of the instruction decode unit 21 will be described in more detail with reference to FIG. 4. The decode unit 2 includes an instruction decoder control unit 201 for requiring the instruction queue memory 1 to transfer an instruction code and instructing an operation code decoder 202 to perform a decoding processing. In response to the instruction from the instruction decoder controller 201, the operation code decoder 202 decodes the instruction code sent through the bus 12 from the instruction queue memory 1 and sends the decoded result through the bus 13 to the decoded instruction queue memory 5. Also, the decoder 202 sends the information revealed by the decoding to indicate the number and kind of the operands, to the instruction decoder controller 201. The operand part of the instruction code sent from the instruction queue memory 1 is supplied to an operand decoder 203 and then decoded in response to the instruction from the instruction decoder controller 201.

Further, the instruction decoder control unit 201 generates a signal (VALID) 14 indicating that the instruction decoding has been completed to validate the inlet entry of the decoded instruction queue memory 5. The control unit 201 also generates a signal (ERROR) 15 for informing the decoded instruction queue memory 5 of the fact that a translation exception has occurred during the translation of the effective address of the operand. In addition, the control unit 201 generates a signal (UP) 16 which is brought to an activation level (e.g., an "H" level), when the address computation unit 3 is required for an address computation, to increment (or count up) the counter field of the inlet entry of the decoded instruction queue memory 5. On the other hand, the control unit 201 receives a signal 20 informing the occurrence of the translation exception ($T_{error}$) from the address translation unit 4. Also, the control unit 201 generates a signal ($EA_{start}$) 22 for requiring the address computation to the address computation unit 3, and receives a ready signal ($EA_{ready}$) 21 indicating the acceptability of the address computation for queuing when the operand decoder 203 requires the address computation to the address computation unit 3. Further, the bus 23 transfers informations including not only the effective address operand and the memory operand but also the displacement value and the kinds of the operands.

The operand decoder 203 informs the instruction decoder controller 201 of the operand type in case the operand is the effective address operand or the memory operand requiring the address computation. The instruction decoder controller 201 requires the address computation unit 3 to perform the address computation, if the computation unit 3 can perform the address computation, and controls the transmission of an information such as the displacement value necessary for the address computation to the address computation unit 3 in response to the information from the operand decoder 203.

Depending upon the number and kind of the operands obtained from the operation code decoder 202, the instruction decoder controller 201 validates the inlet entry of the decoded instruction queue memory 5, if the operand number is zero, but sends the count-up signal to the counter field of the inlet entry of the decoded instruction queue memory 5 each time the address computation is required to the address computation unit 3, if there exists an operand needing the computation of the effective address. Moreover, when the exception occurrence signal ($T_{error}$) 20 is sent to the instruction decoder controller 201 from the address translation unit 4, the instruction decoder controller 201 forcibly stops the operation code decoder 202, the operand decoder 203 and the address computation unit 3, and sends the address translation exception signal (ERROR) 15 to the decoded instruction queue memory 5.

Figure 8:
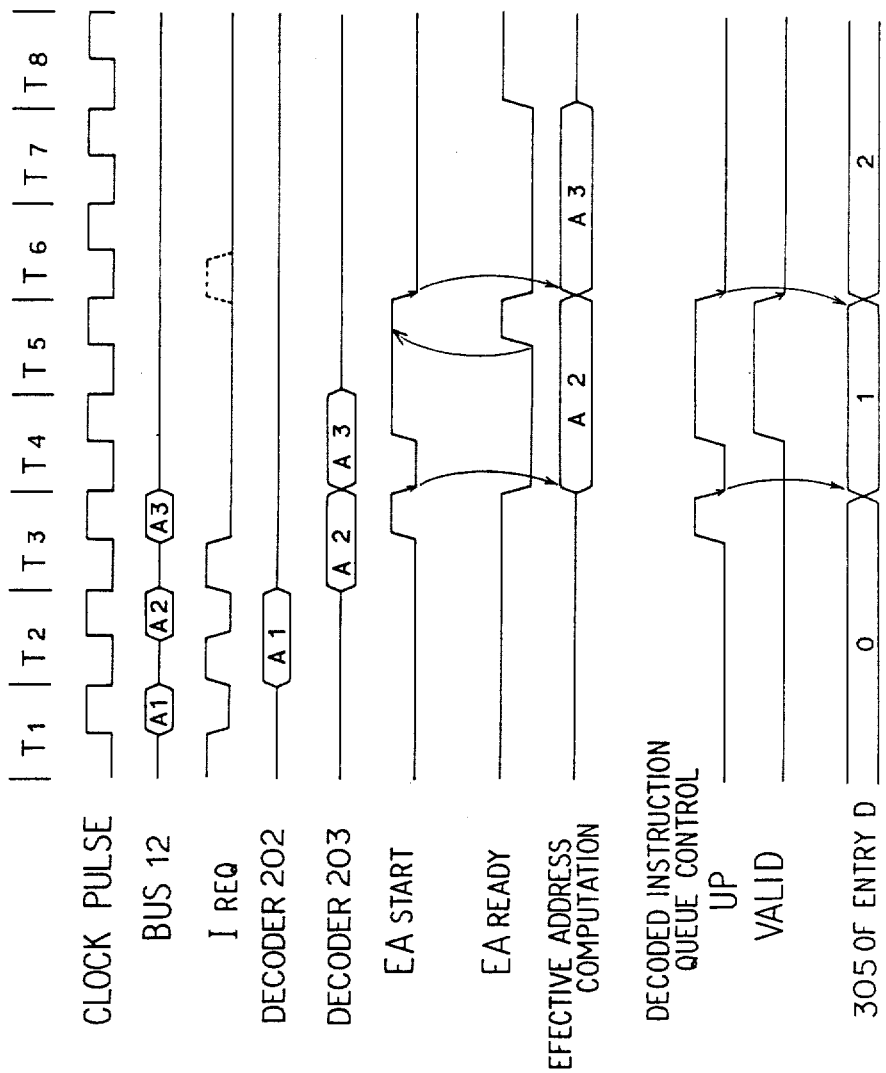
FIG. 8 is a timing chart showing one example of the operations of the instruction decode unit of FIG. 4.

The operations of the instruction decode unit 2 shown in FIG. 4 will be described with reference to the timing chart of FIG. 8. In a $T_1$ cycle, the instruction decode unit 2 sends the instruction code readout requiring signal ($I_{req}$) 11 to the instruction queue memory 1 to require the readout of the instruction code. The instruction A thus read out is transferred through the bus 12. This instruction A has its operation code part A1 decoded in a cycle $T_2$. This decoded information is stored in the decoded instruction queue memory 5 through the bus 13.

Now, it is assumed that the instruction A has two memory operands. In response to the information of the operation code decoder 202, the instruction decoder controller 201 requires the instruction queue memory 1 to send the operand part of the instruction A and operates the operand decoder 203. As a result, on the basis of the result of a first operand part A2 decoded by the operand decoder 203, the address computation start signal ($EA_{start}$) is generated to require the effective address computation to the address computation unit 3. At this instant, since the address computation unit 3 is in a ready status, the address computation is instantly started. At the same timing as that of the address computation starting signal ($EA_{start}$) 22, the instruction decoder controller 201 issues the count-up signal 16 to the decoded instruction queue memory 5.

The requirement of the address computation for a second operand part A3 is not accepted during the address computation, and after the signal ($EA_{ready}$) 21 indicating the address computation acceptability is outputted from the address computation unit 3, the address computation for the second operand part 3 is accepted in a cycle $T_6$. In response to the start of the address computation of the first operand part A2, the instruction decoder controller 201 issues the count-up signal 16 to the decoded instruction queue memory 5 so that the counter takes a value of two. The instruction decoder controller 201 issues the valid signal (VALID) 14 to the decoded instruction queue memory 5, after it has completely issues the address computation requiring signal ($EA_{start}$) 22 for all of the operands of the instruction A that need the address computation, so that the queue entry is validated.

Figure 5:
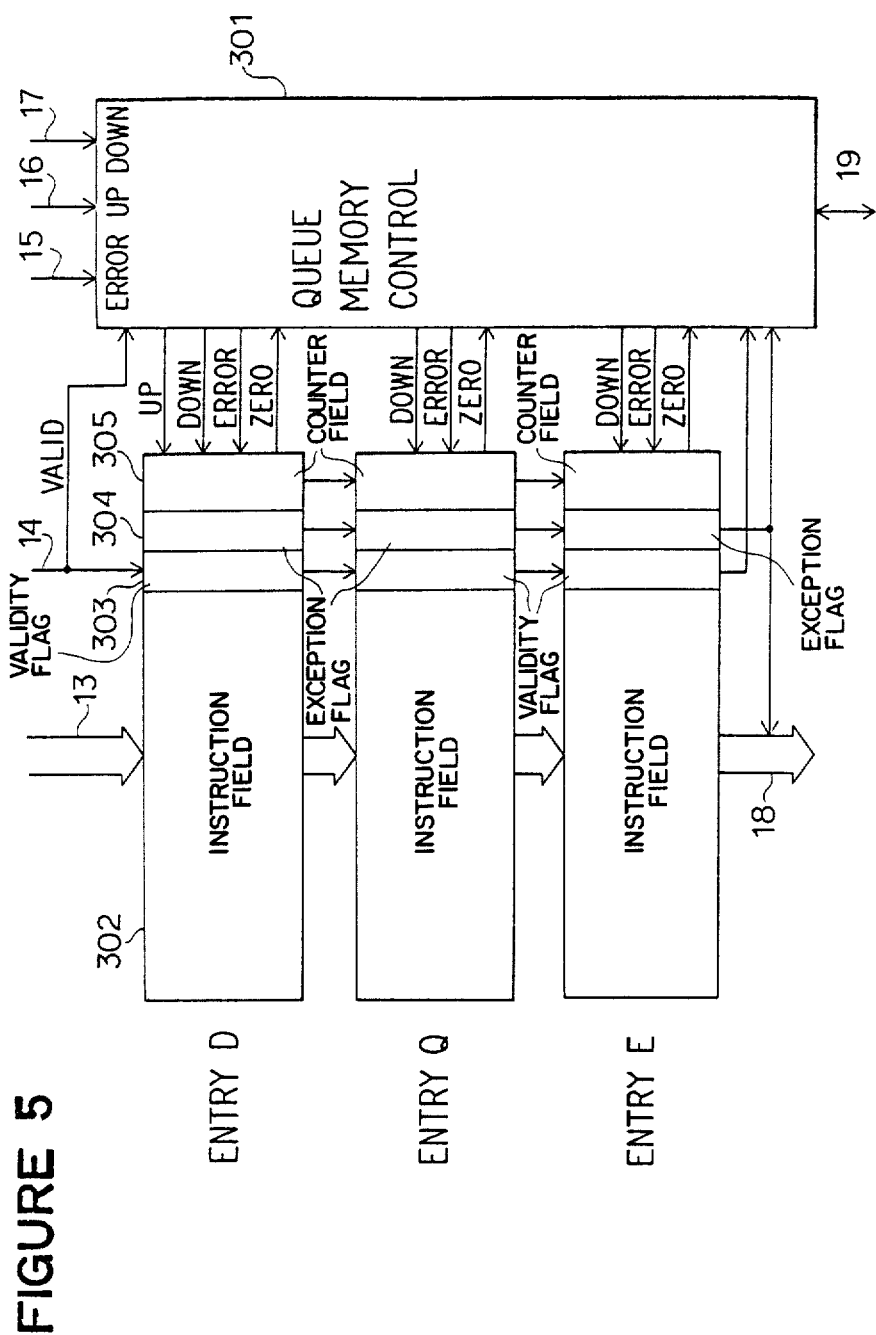
FIG. 5 is a detailed block diagram showing a decoded instruction queue memory of FIG. 3.

FIG. 5 shows in more detail the internal structure of the decoded instruction queue memory 5, which is exemplified by a three-step queue structure. But, the step number of the queue structure is not limited to three, and can be made to any number more than 2. Here: the queue inlet entry to be set with the information form the instruction decode unit 2 is called an entry D; the entry midway of the queue is called an entry Q; and the queue outlet entry read out by the instruction execution unit 7 to execute the instruction is called an entry E. The queue memory 5 includes a queue memory controller 301 for controlling the queue, and an instruction field 302 to be set with the instruction decoded by the instruction decode unit 2 and the information concerning the operands. Further, there are provided a validity flag 303 indicating that the content of the queue is valid, and an exception flag 304 indicating an address translation exception which occurs when the effective address of the operand is translated. Also, there is provided a counter field which is initialized by the instruction decode unit 2 and is decremented each time an address computation requirement for the address computation unit 3 is made form the instruction decode unit 2. In this queue memory 5, only the entry that has its validity flag set is valid. If an invalid entry is present in front of a certain entry (i.e., at the outlet side of the queue), all the contents of a valid entry (including its validity flag) are copied to the front entry, and then, the validity flags and the exception flags of the entry having been valid are reset so that the counter fields take the value of zero.

The actions of the decoded instruction queue memory 5 will be described with reference to FIG. 5. The decoded instruction having been decoded by the operation code decoder 202 and the operand decoder 203 of the instruction decode unit 2 is set in the instruction field 302 of the entry D. The instruction decoder controller 201 increments the counter field 305 of the entry D or the inlet of the queue memory 5 by the use of the count-up signal (UP) 16 each time the operand address computation is requested to the address computation unit 3. The instruction decoder controller 201 sets the validity flag 303 of the entry D when all the address computation requirements of the operands that need the effective address computations are issued.

Once the entry D becomes valid, the queue is automatically advanced in accordance with the vacancy of the front entry. If the address computation unit 3 completes its address computation (and if the address translation additionally succeeds in the case of the memory operand), it outputs a count-down signal (DOWN) 17 to the queue memory controller 301. However, this signal is given as the count-down signal by the queue memory controller 301 to the counter field 305 of one valid entry in which the value of the counter field 305 is not zero and which is the closest to the queue outlet.

In case an address translation exception occurs in the address translation unit 4, on the other hand, the exception occurrence signal (ERROR) 15 is sent through the instruction decoder controller 201 to the queue memory controller 301. This signal 15 is also given as one for setting the exception flag 304 of one valid entry in which the value of the counter field 305 is not zero and which is the closest to the queue outlet.

In case the entry E at the queue outlet is valid and in case the exception flag 304 is set or the counter field 305 is at zero, a signal 19 indicating the instruction executability is set so that the instruction execution unit 7 reads the information out of the entry E through a bus 18. If the exception flag 304 is set, the instruction execution unit 7 conducts an exception processing such as the page fault. Otherwise, the instruction execution unit 7 executes the instruction. When the exception processing or the instruction execution is completed, the instruction execution unit 7 clears the validity flag 303 of the entry E and awaits the input of the decoded information corresponding to a next instruction.

Figure 9:
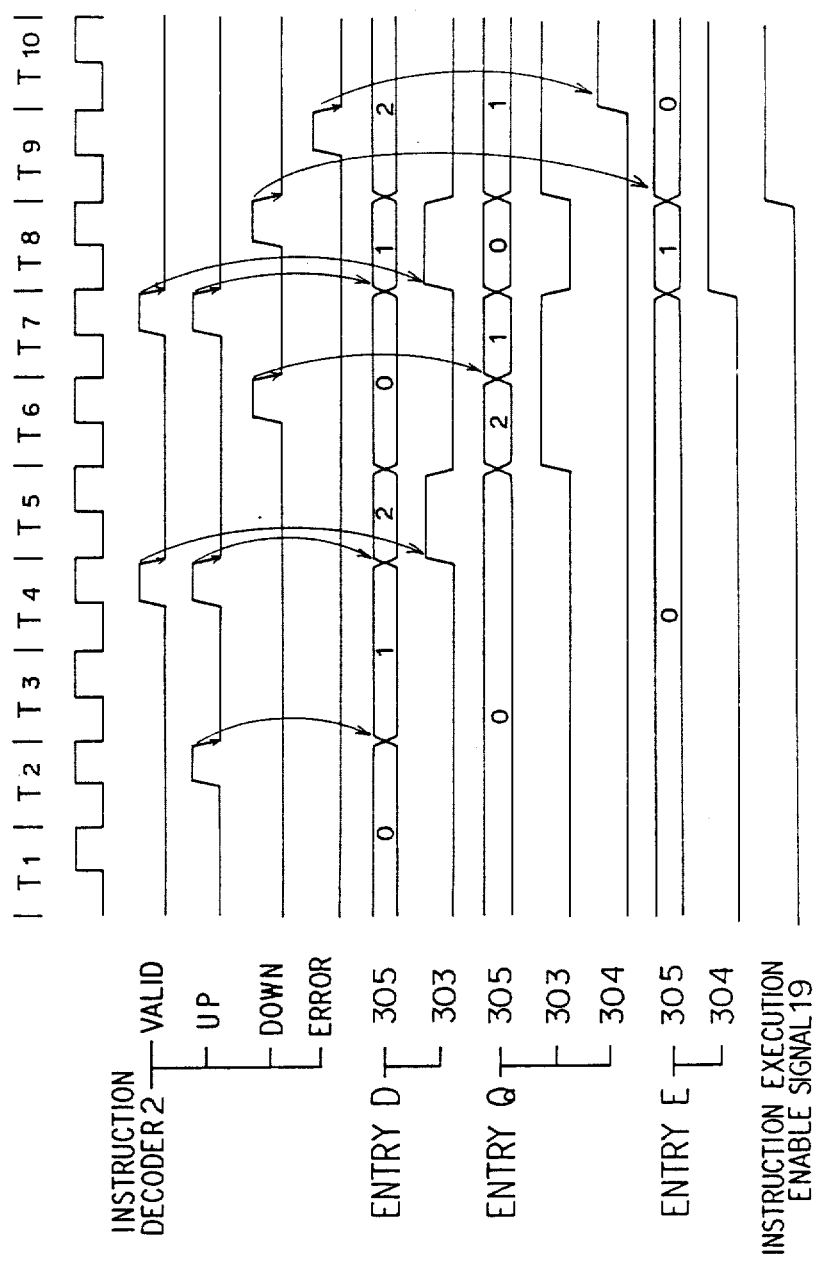
FIG. 9 is a timing chart showing one example of the operations of the decoded instruction queue memory of FIG. 5.

The example of the operations of the decoded instruction queue memory 5 shown in FIG. 5 will be described with reference to the timing chart of FIG. 9. In cycles from $T_1$ to $T_4$, the instruction decode unit 2 decodes the instruction having two operands needing the effective address computation. In the cycle $T_4$, the instruction decode unit 2 completes the decoding of that instruction and decodes a next instruction. The queuing advances for a $T_5$ cycle to a $T_6$ cycle and from a $T_7$ cycle to a cycle $T_8$.

During the cycles $T_6$ and $T_7$, the instruction decode unit 2 is decoding the second instruction. Meanwhile, the address computation unit 3 has completed the address computation of the first instruction, so that the count-down signal (DOWN) 17 from the address computation unit 3 decrements the value of the counter field 305 of that entry Q of the valid entries of the decoded instruction queue memory 5, in which entry Q the value of the counter field is not zero and which entry Q is the closest to the queue outlet. Likewise in the $T_8$ cycle, the count-down signal (DOWN) 17 decrements the value of the counter field of the entry E. As a result, the entry E becomes valid and takes the counter value of zero, so that the queue memory controller 301 outputs the executable signal 19.

In the address computation of the second instruction, an address translation exception occurs, but the translation exception signal (ERROR) 15 generated from the instruction decoder controller 201 sets the exception flag 304 of the entry Q which is correctly stored with the decoded information of the second instruction.

Figure 6:
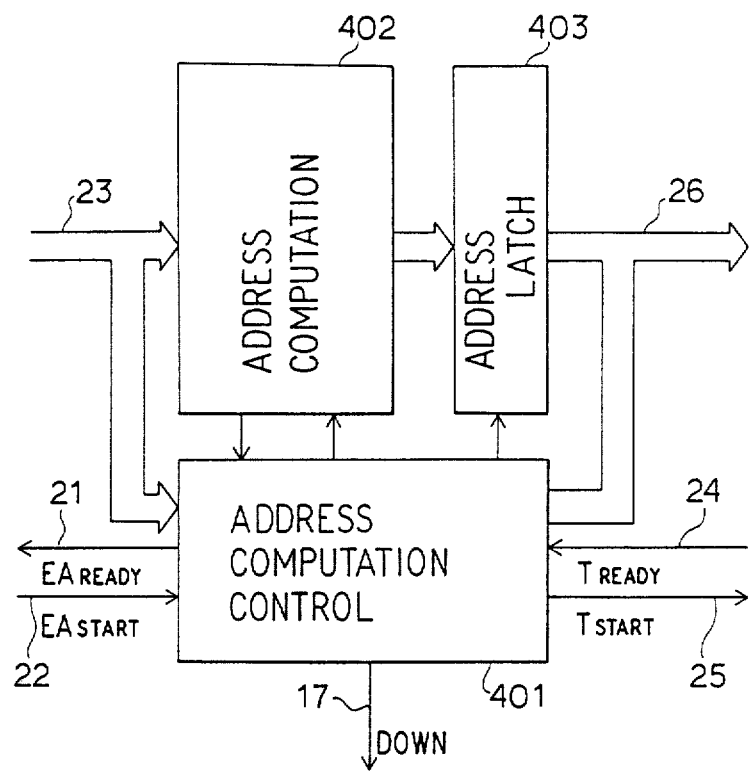
FIG. 6 is a detailed block diagram showing an address computation unit of FIG. 3.

FIG. 6 is a block diagram showing the internal structure of the address computation unit 3 in more detail. The address computation unit 3 includes an address computation controller 401 for controlling the actions of the address computation unit 3, and an address computation section 402 for actually conducting an effective address computation. Further, there is provided an address latch 403 for latching the effective address obtained as a result of the address computation.

The information 23 of the effective address computation requiring informations, which concerns the operand type indicating the effective address operand or the memory operand and the addressing mode, is inputted to the address computation controller 401, and data necessary for the address computation such as the displacement are inputted to the address computation section 402. The address computation controller 401 instructs the address computation section 402 of the kind of computation in accordance with the addressing mode instructed.

The address computation unit 4 can conduct a next address computation to be executed while latching the just previously computed effective address in the address latch 403. During the address computation, the address computation controller 401 inactivates the signal (EA$_{ready}$) 21 indicating the address computation acceptability so that a new address computation requirement may not be accepted. The address computation is completed at the instant when the computation result (i.e., the output of the address computation section 402) is inputted as the effective address to the address latch 403.

At the completion of the address computation, the address computation section 402 activates the signal (EA$_{ready}$) 21. In response to the signal (EA$_{start}$) 22, the data on the bus 23 are latched, and the address computation is conducted in accordance with the addressing information. In case the operand is a memory operand, the effective address latched by the address latch 403 is outputted to a bus 26 together with an address translation requiring signal (T$_{start}$) 25 to instruct the address translation unit 4 to perform the address translation, if a signal (T$_{ready}$) 24 indicating that the address translation unit 4 is capable of executing the address translation is active. When the address translation requirement is accepted to the address translation unit 4, the signal (T$_{ready}$) 24 becomes inactive. The address computation unit 3 is informed of the normal completion of the addressing translation when the address translation unit 4 activates the signal (T$_{ready}$) 24, again. In the case of the memory operand, the address computation controller 401 sends the count-down signal (DOWN) 17 to the decoded instruction queue memory 5 in response to te normal completion of the address translation. In case the operand has an effective address, on the other hand, the effective address latched by the address latch 403 is transferred through the bus 26 to the effective address register 6. This means that the address computation is completed, and therefore, the count-down signal (DOWN) 17 is sent to the decoded instruction queue memory 5 from the address computation controller 401.

Figure 7:
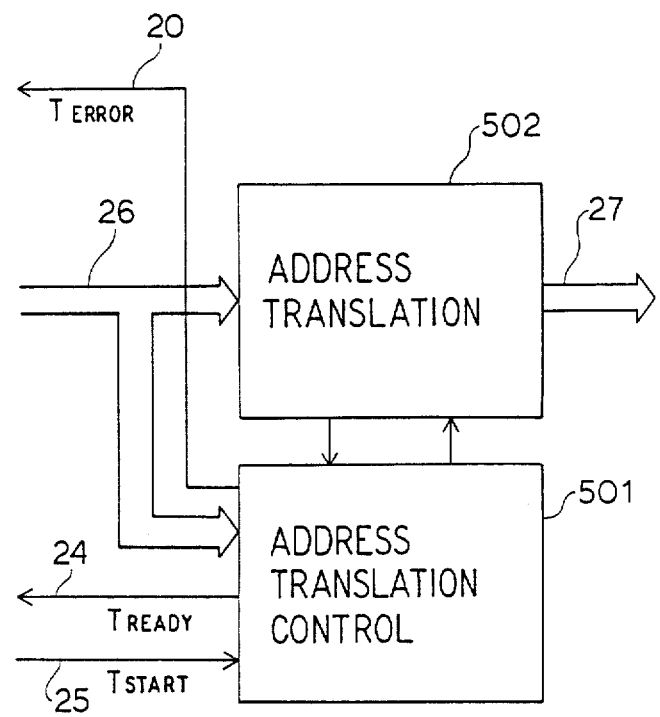
FIG. 7 is a detailed block diagram showing an address translation unit of FIG. 6.

FIG. 7 is a block diagram showing the internal structure of the address translation unit 4 in more detail. The address translation unit 4 includes an address translation controller 501 of controlling an address translator 502. This address translator 502 transforms a virtual address inputted through the bus 26 into a real address and checks the translation exception such as the page fault. The effective address sent from the address computation nit 3 and the information concerning the memory access are inputted through the bus 26 to the address translator 502. In response to the address translation requiring signal (T$_{start}$) 25, the address translation controller 501 is started. During the address translation, the address translator 502 inactivates the signal (T$_{ready}$) 24 indicating that the address translation is acceptable. If the address translation is normally completed, the address translation controller 501 activates the signal (T$_{ready}$) 24 to output the information concerning the real address obtained by the translation and the memory access to a bus 27. In case a translation exception such as the page fault occurs during the address translation, the address translation controller 501 sends the exception occurrence signal (T$_{error}$) 20 to the instruction decode unit 2 while leaving the Tready signal 24 inactive.

The overall operations of the embodiment of the present invention shown in FIG. 3 will be described with reference to the timing chart of FIG. 10. A first description will be made of the decoding of the instruction A having the two memory operands (A2 and A3). The instruction decode unit 2 requires the instruction queue memory 1 to perform the readout of the instruction code so that the operation code part A1 of the instruction A in the instruction queue memory 1 is outputted through the bus 12 to the operation code decoder 202.

If the decoded result of the operation code decoder 202 reveals that the instruction A has two memory operands, the instruction decode unit 2 requires the instruction queue memory 1 to perform the readout of the first operand part A2. The first operand part A2 is inputted through the bus 12 to the operand decoder 203 so that it is decoded.

When the address computation of the address computation unit 3 is started on the basis of the decoded result of the first operand part A2, the instruction decode unit 2 sends the count-up signal (UP) 16 to the decode instruction queue memory 5 to increment the counter field 305 of the inlet entry D. While the address computation of the first operand part A2 is being conducted by the address computation unit 3, the second operand part A3 read out in the cycle T$_3$ is decoded.

However, the address computation requirement of this second operand part A3 is deferred until the address computation of the first operand part A2 is completed. When this address computation of the first operand part A2 is completed, the computed effective address is sent to the address translation unit 4 so that it is translated (in the cycles T$_6$ and T$_7$). In this meanwhile, the address computation requirement of the second operand part A3 having been deferred until this time is accepted to the address computation unit 3.

When the instruction decode unit 2 issues the address computation requirement (EA$_{ready}$) 22 to the address computation unit 3, it increments the counter field 305 of the decoded instruction queue memory 5. After the instruction decode unit 2 has outputted an address computation requirement for such one of the operands of the instruction A as needs the effective address computation, it sets the validity flag 303 of the decoded instruction queue memory 5 and is shifted to the decoding of a next instruction B.

At the instant when the address translation of the first operand A2 is completed, the address translation unit 4 sends the address translation acceptability signal (T$_{ready}$) 24 to the address computation unit 3. In response to this, the address computation circuit 3 sends the count-down signal (DOWN) 17 to the decoded instruction queue memory 5. The address computation unit 3 sends the effective address of the second operand part A3 to the address translation unit 4 to require its address translation.

When the address translation of the second operand part A3 is completed, the count-down signal (DOWN) 17 is sent to the counter field 305 of the decoded instruction queue memory 5, like the case of the first operand part A2, in response to the signal from the address computation unit 3. In response to the decrement signal following the completion of the address translation of the second operand part A3, the counter field 305 of the decoded instruction queue memory 5 for the instruction A takes the value of zero, so that the instruction A is completely decoded. Thus, the instruction execution unit 7 comes into the instruction executable status.

Figure 10:
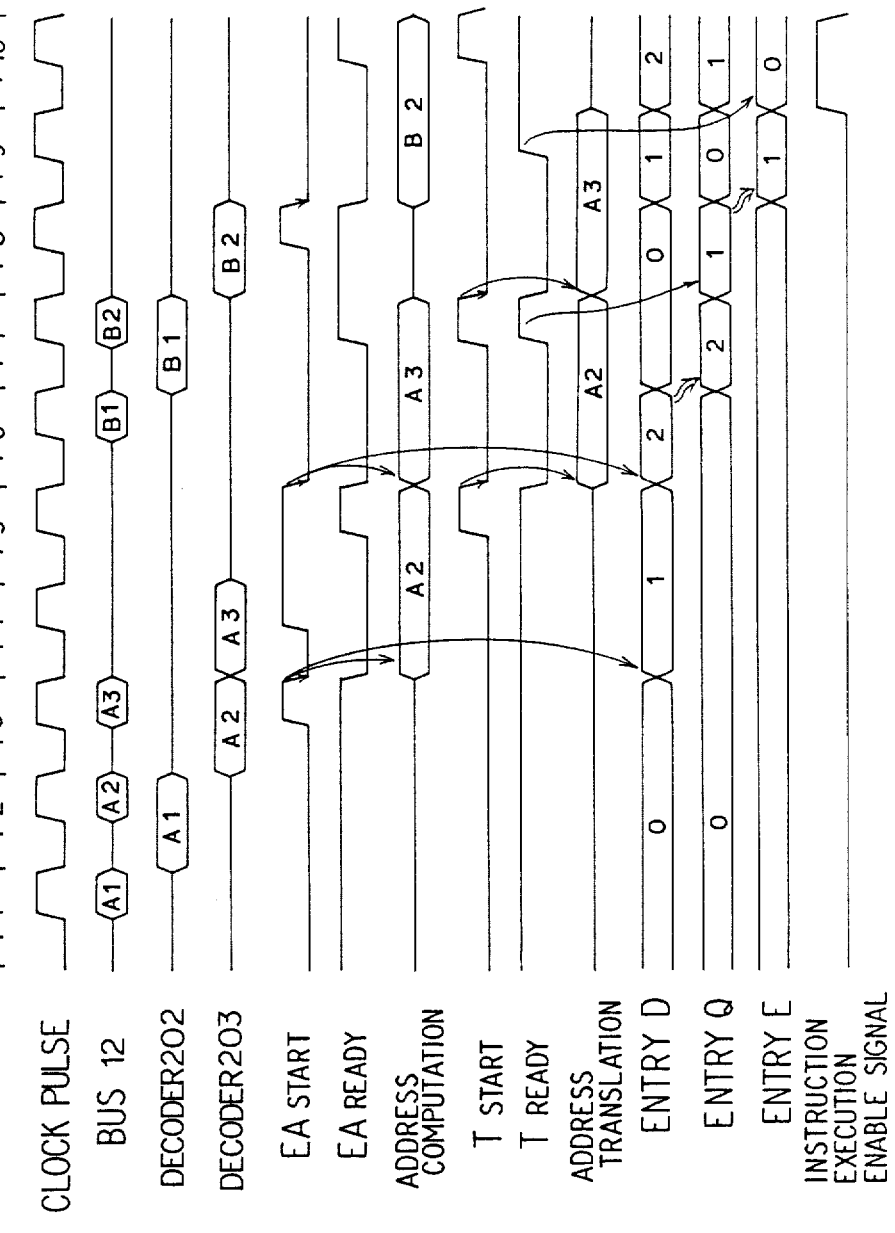
FIGS. 10 and 11 are timing charts showing one example of the operations of the instruction decode unit of FIG. 4 in the embodiment of the present invention.

If, in FIG. 10, the instruction B has no operand, the entry of the decoded instruction queue memory 5 of the instruction B becomes valid of the cycle $T_8$ immediately after the instruction decoding in the cycle $T_7$. Since the instruction has no operand, moreover, the value of the counter field 305 of the queue memory 5 for the instruction B takes the value of zero, so that the instruction B is put in an instruction executable queue entry in the cycle $T_8$. In this case, the counter decrement signal following the completion of the address translation of the operands A2 and A3 of the instruction A decrements the value of the counter field 305 corresponding to the instruction A in the queue. In other words, as shown in FIG. 5, the decrement signal decrements the counter value of the entry which is valid in the queue and which has a counter value other than zero and is the closest to the queue outlet.

Figure 11:
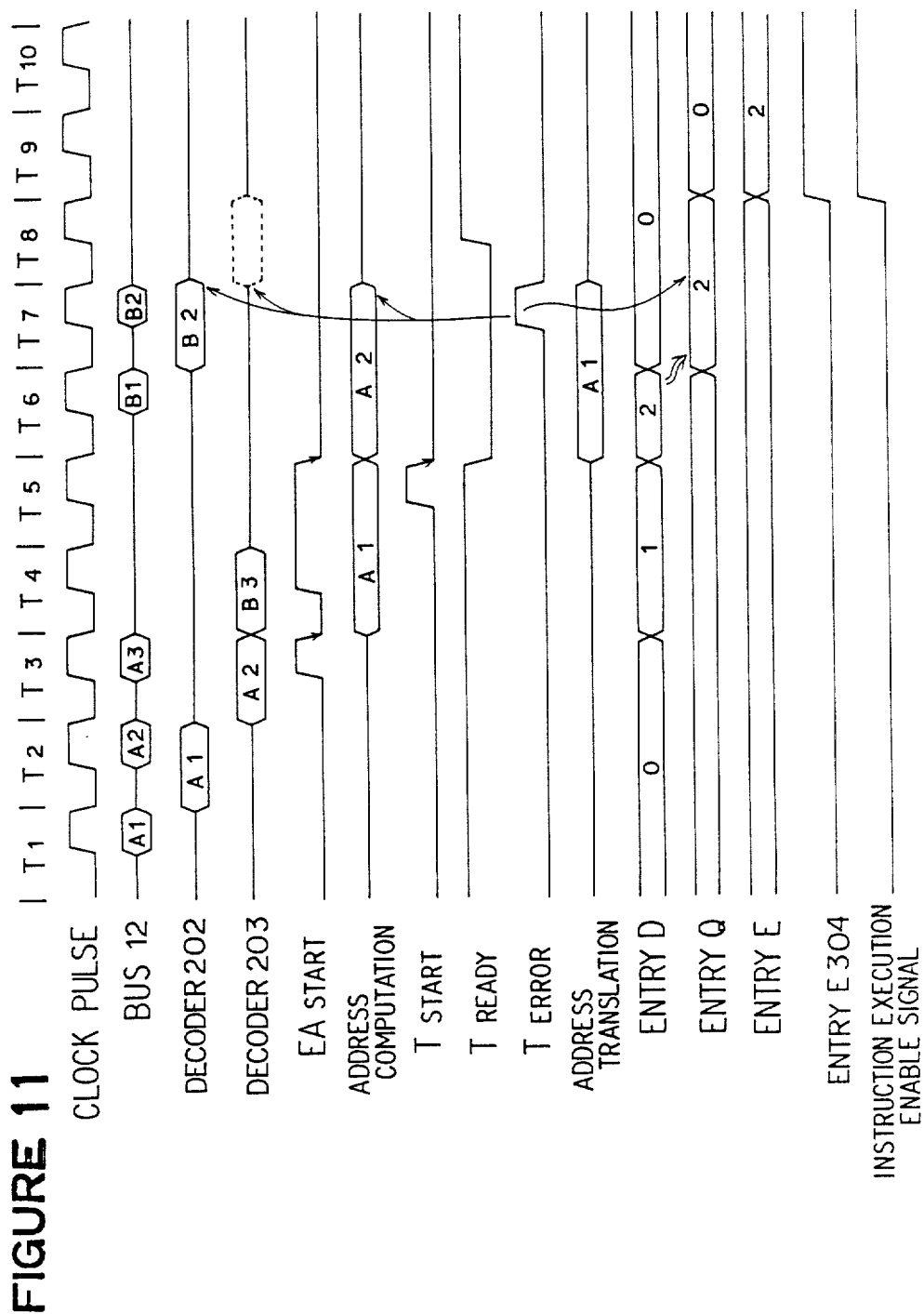

FIG. 11 is a timing chart showing the same behaviors of decoding the instruction A as those of FIG. 10 but illustrating the case in which a translation exception occurs during the address translation of the operand part A2. An exception occurs as a result of the address translation in the cycle $T_6$. Then, the address translation unit 4 sends the signal $T_{error}$ 20 to the instruction decode unit 2 to inform it of the occurrence of the exception. The instruction decode unit 2 sends the exception signal (ERROR) 15 to the decoded instruction queue memory 5, and stops the processing of an instruction B being decoded and the address computation of the address computation unit 3. As a result, the exception flag 304 of that valid queue entry of the decode instruction queue memory 5, which has a counter value other than zero and which is the closest to the queue outlet, is set. Thus, the instruction execution unit 7 instantly processes the exception, because the exception flag 304 of the decoded information of the instruction A of the queue outlet entry E, i.e., the output of the queue memory 5 is set.

As has been described hereinbefore, according to the present invention, the instruction decoding, the effective address computation of the operand, and the address translation from the virtual address into the real address can be respectively executed in parallel. Moreover, the data processing system comprises: means for informing the normal and abnormal completion of the address translation of the operand of the instruction of a previously decoded information in the decoded instruction queue memory; and means for translating the decoded information of that instruction into an executable decoded instruction at the instant when all the address translations of the operands of the instruction needing the address translations are completed. Thus, the instruction decode unit can conduct the proceeding decoding. As a result, the microprocessor having the virtual memory managing function can process the program at a higher speed than the prior art.

The invention has thus been shown and described with reference to specific embodiments. However, it should be noted that the invention is in no way limited to the details of the illustrated structures but changes and modifications may be made within the scope of the appended claims.

What is claimed is:

1. A data processing system including: instruction prefetch means having an instruction queue memory for storing a prefetched instruction code; instruction decoding means for retrieving an instruction code from said instruction queue memory and for decoding an operation code and an operand field, if any, of the instruction code retrieved from said queue memory, said instruction decoding means also generating, on the basis of the result of decoding of the operand field, computation data necessary for effective address computation of at least one of an effective address operand and a memory address operand, and an effective address computation request signal; effective address computing means for receiving said computation data and for conducting an effective address computation is response to the effective address computation request signal generated by said instruction decoding means; address translating means for translating a virtual address received from said effective address computing means into a real address and issuing a translation completion signal and for detecting a translation exception; and instruction executing means for receiving and executing a decoded instruction code output by said instruction decoding means wherein the improvement comprises a decoded instruction queue memory having a queue structure comprising at least first, second and third entries, said first entry coupled to said instruction decoding means for latching the decoded instruction code outputted by said instruction decoding means, said second entry coupled to said first entry for latching the information shifted out of said first entry, and said third entry coupled to said second entry and said instruction executing means for latching the information shifted out of said second entry and for outputting the latched information to said instruction executing means, each of said first, second and third entries having a count means, the count means of said first entry having a count-up function and a count-down function and the count means of each of said second and third entries having a count-down function; and a queue memory control means operating to cause said count means of said first entry to be counted up in response to said effective address computation request signal, and to count down the count means of one of said entries which has a non-zero content and is closest to a queue outlet of said instruction executing means each time an address translation complete signal is generated by said address translating means, the contents of the count means of said first and second entries being shifted to the count means of said second and third entries, respectively when the information latched in said first and second entries is shifted to said second and third entries, respectively.

2. A data processing system according to claim 1, wherein the decoded instruction code is transferred from said third entry to said instruction executing means only when said count means of said third entry assumes the value of zero.

3. A data processing system according to claim 1, further comprising an effective address register for latching the effective address value issued from said effective address computing means if the operand has an effective address value.

4. A data processing system according to claim 1, wherein said count means of said first, second and third entries includes a counter field formed in each of the entries of said decoded instruction queue memory and initialized by said instruction decoding means.

5. A data processing system according to claim 4, wherein said decoded instruction queue memory further includes in each of said entries: an instruction field set with an information concerning the decoded instruction and operand of said instruction decoding means; a valid flag indicating the validity of the content of said queue; and an exception flag indicating the occurrence of an address translation exception in the address translation of said address translating means.

6. A data processing system according to claim 1, wherein said instruction decoding means includes: an instruction decoder control for requiring said instruction queue memory the transfer of said instruction code and instructing a decoding; an operation code decoder for decoding the instruction code of said instruction queue memory in response to the instruction of said instruction decoder control and sending the decoded result to said decoded instruction queue memory and the information indicating the number and kind of the operands revealed to said instruction decoder control; and a operand decoder for decoding the operand part of the instruction code of said instruction queue memory in response to the instruction of said instruction decoder control.

7. A data processing system according to claim 1, wherein said effective address computing means includes: an address computation control for controlling the actions of said effective address computing means; and address computation section for conducting an effective address computation; and an address latch for latching the effective address computed by said address computation section.

8. A data processing system according to claim 1, wherein said address translating means includes: an address translator for translating a real address computed by said effective address computing means into a virtual address and checking a translation exception.

9. A data processing system including: instruction prefetch means having an instruction queue memory for storing a prefetched instruction code; instruction decoding means for retrieving an instruction code from said instruction queue memory and for decoding an operation code and an operand field, if any, of the instruction code read out of said queue memory, said instruction decoding means also generating, on the basis of the result of decoding of the operand field, computation data necessary for effective address computation of at least one of an effective address operand and a memory address operand, and an effective address computation request signal; effective address computing means for receiving said computation data for conducting an effective address computation in response to the effective address computation request signal generated by said instruction decoding means; address translating means for translating a virtual address received from said effective address computing means into a real address to issue a translation completion signal and for detecting a translation exception; and instruction executing means for reading out and executing a decoded instruction code output by said instruction decoding means, wherein the improvement comprises a decoded instruction queue memory having a queue structure composed of at least first, second and third entries, said first entry coupled to said instruction decoding means for latching the decoded instruction code outputted by said instruction decoding means, said second entry coupled to said first entry for latching the information shifted out of said first entry, and said third entry coupled to said second entry and said instruction executing means for latching the information shifted out of said second entry and for outputting the latched information to said instruction executing means, each of said first, second and third entries having a count means, a valid flag indicating the validity of the content of each entry, and an exception flag indicating the occurrence of an address translation exception in the address translation of said address translating means, the count means of said first entry having a count-up function and a count-down function and the count means of each of said second and third entries having a count-down function; and a queue memory control means operating to cause said count means of said first entry to be counted up in response to said effective address computation request signal, and to count down the count means of one of said entries which has a non-zero content and is closest to a queue outlet of said instruction executing means each time an address translation complete signal is generated by said address translating means, said valid flag of said first entry being written when said instruction decoding means has completed its decoding operation, said exception flag of each entry being written when the address translation exception has occurred in the address translation of said address translating means, and the contents of said count means, said valid flag and said exception flag of said first and second entries being shifted to said count means, to said valid flag and said exception flag of said second and third entries, respectively when the information latched in said first and second entries is shifted to said second and third entries, respectively.

10. A data processing system including: instruction prefetch means having an instruction queue memory for storing a prefetched instruction code; instruction decoding means for retrieving an instruction code from said instruction queue memory and for decoding an operation code and an operand field, if any, of the instruction code read out of said queue memory, said instruction decoding means also generating, on the basis of the result of decoding of the operand field, computation data necessary for effective address computation of at least one of an effective address operand and a memory address operand, and an effective address computation request signal; effective address computing means for receiving said computation data for conducting an effective address computation in response to the effective address computation request signal generated by said instruction decoding means; address translating means for translating a virtual address received from said effective address computing means into a real address to issue a translation completion signal and for detecting a translation exception; and instruction executing means for reading out and executing a decoded instruction code output by said instruction decoding means, wherein the improvement comprises a decoded instruction queue memory having a queue structure composed of at least first, second and third entries, said first entry coupled to said instruction decoding means for latching the decoded instruction information outputted by said instruction decoding means, said second entry coupled to said first entry for latching the information shifted out of said first entry, and said third entry coupled to said second entry and said instruction executing means for latching the information shifted out of said second entry and for outputting a latched information to said instruction executing means, each of said first, second and third entries having a count means, the count means of said first entry being both a first direction and in a second direction opposite to said first direction and the count means of each of said second and third entries being counted only in said second direction; and a queue memory control means operating to cause said count means of said first entry to be counted in said first direction in response to said effective address computation request signal, and to cause the count means of one entry of said entries, which entry has the count means whose value is not a predetermined value and which entry is closest to a queue outlet of said instruction executing means, to be counted down at each time an address translation complete signal is generated by said address translating means, the content of the count means of said first and second entries being shifted to the count means of said second and third entries, respectively when the information latched in said first and second entries is shifted to said second and third entries, respectively.

* * * * *